United States Patent [19]

Connors

[11] 4,060,736
[45] Nov. 29, 1977

[54] CONTROL SYSTEM FOR CYCLIC OPERATIONS

[75] Inventor: Robert Harvey Connors, Chicago, Ill.

[73] Assignee: Triangle Package Machinery Co., Chicago, Ill.

[21] Appl. No.: 666,018

[22] Filed: Mar. 11, 1976

[51] Int. Cl.$^2$ .................................... H01H 7/00
[52] U.S. Cl. ............................ 307/141; 53/59 R; 123/148 E
[58] Field of Search ............... 307/117, 116, 106, 107, 307/108, 109, 110, 141.4, 141, 141.8; 123/148 E; 320/1; 235/92 P, 92 A, 92 T, 92 MP, 92 PK, 92 MC; 318/653; 53/59 R

[56] References Cited

U.S. PATENT DOCUMENTS

| | | | |
|---|---|---|---|
| 3,356,082 | 12/1967 | Jukes | 123/148 F |
| 3,365,582 | 1/1968 | Mellinger | 307/141 |
| 3,923,022 | 12/1975 | Scholl | 123/148 E |

Primary Examiner—Robert K. Schaefer
Assistant Examiner—Morris Ginsburg
Attorney, Agent, or Firm—Emrich, Root, O'Keeffe & Lee

[57] ABSTRACT

A control system for a cyclically operating machine is disclosed wherein one or more operations are to be performed during each successive machine cycle. Signal generating means or a voltage generating means proportional to machine speed establish a sequence of signals or a voltage during each machine cycle, for producing a charge. An initial charge level or voltage is established, which can have a value of either a zero voltage or some other predetermined voltage at the beginning of each cycle. The voltage is changed as the signals are received or voltage is generated until a second predetermined voltage is reached, which can be either higher or lower than the initial voltage, at which time a control signal is emitted which may perform an operation associated therewith, such as by starting or stopping a machine motion. Adjusting means are provided to control the rate of change of voltage level and thereby change the point or time in the machine cycle at which the second voltage is reached, and thus vary the time within a cycle at which the operation associated therewith with occur.

25 Claims, 13 Drawing Figures

000
CONTROL SYSTEM FOR CYCLIC OPERATIONS

BACKGROUND OF THE INVENTION

In machines which have a cyclic operation wherein, during each cycle, one or more operations are to be performed, it has been customary in the past to control the timing of these operations within a cycle by various means. For example, a rotating shaft may have cams thereon, each of which actuates a switch at a predetermined point or degree in the machine cycle, which causes a certain operation to be performed. When it is desired to change the degree in the machine cycle at which a particular operation occurs, however, it becomes necessary to change the cam associated with that operation, or provide cams which are adjustable. This may be time consuming and troublesome and usually requires that the machine be shut down while being adjusted. This usually is a repetitive trial and error procedure until the required adjustment is made. Furthermore, being mechanical devices, the cams and switches require maintenance.

Another method of controlling the timing of operations within a machine cycle has been to count pulses emitted by a pulse generator so that an operation associated therewith may be caused to occur at the time a predetermined number of pulses have been counted in each machine cycle. Such a system, however, has the disadvantage of being more expensive and of being more difficult to change the setting, since it requires reset of the memory to a different count.

The present invention is designed to provide electronic control means for cyclically operating machines which overcome the disadvantages of controls heretofore known, as well as to simplify the operation of such controls and make them less expensive. Also, this invention permits fine adjustment of the degrees in the machine cycle at which the operations are to occur for optimum performance while the machine is cycling.

BRIEF SUMMARY OF THE INVENTION

The present invention relates generally to a control system for controlling the timing of one or more operations which occur during each cycle of a cyclic machine, and is especially directed to an electronic control system for establishing the beginning of a machine cycle and for controlling the timing of the occurence of one or more operations within a machine cycle.

More specifically, the control system of the present invention embodies signal generating means to establish a sequence of signals within a cycle. An initial voltage level or signal level is provided and, in response to each signal, this voltage level or signal level is changed by increasing or decreasing said level to a second voltage or signal level, which may be considered a reference voltage or a reference signal level. When the second or reference signal level is reached a control signal is emitted which controls the operation to be performed, such as by starting or stopping the operation. The voltage or signal level then returns to the initial level and the process is repeated during the next succeeding machine cycle.

The initial voltage or signal level can be zero or any other desired determined level, and a second or reference level is established which is different from the initial voltage.

When the initial voltage or signal level is zero, the signals are accumulated until the second or reference level is reached at which time the associated operation is performed. Suitable adjusting means are provided for adjusting the rate at which the voltage level is changed from the initial to the second voltage level. If the initial level is higher, then the response to the signals may lower the signal or voltage level to the second or reference level.

Alternatively, the rate at which the voltage level is changed may remain constant with suitable means being provided to adjust the second voltage level.

Also, the second level may be higher than the initial level even though the initial level is something more than zero, thereby advancing the time the second level will be reached so as to initiate some action a predetermined time in advance of the time the actual operation is to be performed, all as will be more particularly pointed out hereinafter.

Detecting means are also provided for detecting a preselected repeatable point of reference in a cycle to establish the beginning of the cycle.

In view of the foregoing it is a principle object of the present invention to provide, in a cyclic machine, novel electronic control means for controlling the timing of the occurrences of one or more operations during each machine cycle.

Another object is to provide, in a cyclic machine, electronic control means for controlling the timing of the occurrences of operations within each machine cycle so that the same operation is performed within each cycle at the same cyclic degree regardless of the cyclic rate.

Another object is to provide, in a cyclic machine, electronic control means for controlling the timing of the occurrences of operations within each machine cycle so that the same operation is performed within each cycle at a constant time prior to the same cyclic degree, regardless of the cyclic rate.

A further and more specific object is to provide novel electronic control means for controlling the occurrences of one or more operations during a machine cycle, wherein a signal generator emits a sequence of signals, and a receiver of the signals is caused to reach a predetermined reference signal level different from the initial signal level of the receiver at the beginning of a machine cycle. When the reference signal level is reached a control signal is emitted which controls the operation associated therewith, such as by starting or stopping it.

Other objects of the invention will appear more fully hereinafter as the description proceeds.

DETAILED DESCRIPTION OF THE INVENTION

The electronic control system of the present invention is applicable for use in connection with a wide variety of cyclically operable machines, wherein one or more operations are performed during a machine cycle, and wherein such operations are controlled by devices such as air or hydraulic cylinders, solenoids, and any electrically actuated devices. For purposes of illustration the invention will be described in connection with the control of the various operations which may take place during the cyclic operation of a bag forming, filling and sealing machine, although such illustration is not intended to be limiting in any way.

In such machines a web of material is formed into a tube; a sealer seals the overlapped edges of the tube, and a pair of sealing jaws are brought together to grip, to seal and to cut the tube and form a package. When the jaws seal the tube they thereby seal the top of a package which has been filled and, at the same time, provide a bottom for the next package. In a vertical form, fill and seal machine, the jaws then move downwardly and a quantity of product is dumped into the package. The jaws then separate and move upwardly and are then brought together above the product to seal the top of the package and form the bottom of the next one. The jaws are also provided with cutting means to separate the filled and sealed bag from the remainder of the tube. These are all operations which are well known in this particular art and are recited here only for the purpose of illustrating operations which may be controlled by the electronic control system of the present invention.

Heretofore a series of cams on a rotating one revolution per machine cycle have been provided, one for each operation to be performed, and each of which actuated a switch at a predetermined time within each cycle to close or open a circuit, thereby causing the operation associated therewith to occur.

A machine cycle may be considered as beginning at any desired point in the machine operation, as long as it is a repeatable point of reference. For example, the point in the machine cycle at which the film is cut may be at 90° in the machine cycle, so that the reference point which marks the end of one machine cycle and the beginning of the next cycle could be considered as being 90° in the machine cycle prior to the cutting of the film. If it is considered that there are 360° in each machine cycle, the reference point is repeated every 360°.

With cam operated switches, the cam can be set to close or open a switch and cause the occurrence of an operation at any desired degree in the machine cycle, but to change the cyclic degree at which a particular operation is to be performed requires changing the rotational relationship between the cam and the switch.

In the present invention a sequence of signals is emitted or a voltage is generated during each machine cycle. One signal or voltage generator and certain elements in the circuit associated therewith will be provided for all of the operations to be performed within a cycle of the machine. Certain other elements, however, of the circuit are duplicated for each separate operation. These elements are adjustable so that a particular operation associated therewith can be caused to occur at any desired predetermined time or cyclic degree within each machine cycle.

Figures 1, 2:
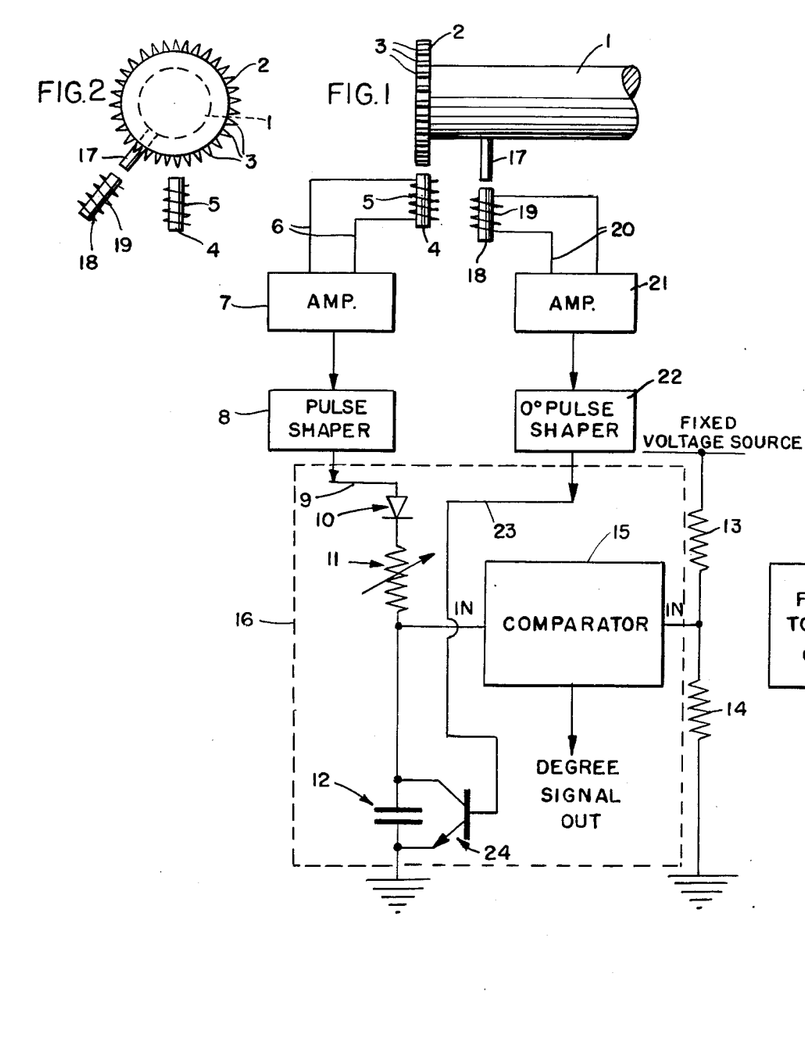
FIG. 1 is a diagram illustrating a preferred embodiment of the invention wherein signals are generated by the use of a toothed wheel and sensor means.
FIG. 2 is a diagrammatic illustration in elevation of the signal generator means shown in FIG. 1.

It will be evident that there are various specific devices which can be used to generate signals or voltages, as well as various types of sensors for such signals. FIG. 1 illustrates a preferred embodiment of such a signal or voltage generating means useful in connection with the present invention.

Referring now to FIG. 1, there is illustrated a rotatable shaft 1 which has associated therewith a toothed wheel 2. This wheel rotates with the shaft and is provided with a number of teeth 3. The sensor is illustrated as comprising a permanent magnet 4 which is mounted adjacent to wheel 2 and has a coil 5 thereon. Each time a tooth 3 passes the permanent magnet 4 the field changes and that change of field produces a signal which is carried by the leads 6 of the coil 5 to the amplifier 7. The amplified signals are then converted into non-overlapping pulses by the pulse shaper 8 where the amplitude and time duration of each respective pulse in each cycle is identical. The amplitude and time duration of the respective pulses remain identical regardless of machine cyclic speed. The time interval between pulses will vary inversely with the cyclic speed of the machine. In the preferred embodiment described herein, each successive pulse in a cycle is also identical with respect to amplitude and time duration.

For purposes of illustration and simplicity, this wheel 2 and shaft 1 are shown as rotating together so that both will rotate once for each machine cycle. In actual practice however, due to the large number of signals desired during each cycle, the wheel rotates a relatively large number of times during one machine cycle, and gear reduction means are provided to rotate the shaft 1 only once for each cycle.

The signals, which in this case are pulses, are applied through line 9 to diode 10 and variable resistor 11 to the capacitor 12, where they are integrated into a charge on the capacitor. Diode 10 prevents the capacitor from draining in between pulses.

This charge on the capacitor may be any suitable predetermined value and for purposes of illustration it may be assumed that the capacitor is to be charged up to 10 volts or more. Resistors 13 and 14 comprise a voltage divider network between ground and a source of direct current voltage to produce a fixed reference voltage, which is put into the comparator 15. This comparator compares the voltage building up in capacitor 12 to the fixed reference voltage, which in the illustrated example is 10 volts, and when the capacitor voltage reaches this reference voltage the comparator sends out a control signal. The capacitor may continue to be charged past the reference voltage but this has no further effect. This signal may continue until the next cyclic degree reference signal which thereupon begins the next succeeding cycle.

The variable resistor 11 can be adjusted to regulate the amount of charge received by capacitor 12 from each pulse. Thus, for a given adjustment of resistor 11 the comparator will send its output signal at the same number of cyclic degrees of the machine within each cycle, regardless of machine speed, so long as the pulses do not overlap.

It is apparent that the rate of voltage build-up in the capacitor 12 is proportional to the machine speed. If a given operation, for example, is to occur at 90° in the machine cycle, the variable resistor 11 will be set so that the reference voltage level in the capacitor 12 will be reached at 90° in the machine cycle.

On the other hand, if the operation which is controlled by this particular circuit is to take place at some other cyclic degree in the machine cycle, such as for example 270°, the variable resistor 11 can be set to charge the capacitor at a slower rate so that the reference voltage level is not reached until 270 cyclic degrees in the machine cycle.

It will also be evident that an alternative form of adjustment could be accomplished by having the resistor fixed and changing the size of the capacitor. A larger capacitor would take a greater period of time to reach the level of the reference voltage, and this is another way of regulating the time in cyclic degrees at which the reference voltage is reached in the machine cycle.

A still further alternative method, which would also be evident to those skilled in the art, would be to make the resistor 11 a fixed resistor and to make the resistor 13 variable. This then would vary the reference voltage in the comparator so that it would detect a lower voltage level in the capacitor 12 for emitting a control signal at a cyclic degree of 90° and would detect a higher voltage in the capacitor at, for example, 270° in the machine cycle.

It will be noted that the elements of the circuit within the dotted line 16 will be duplicated for each operation which is to be performed during the machine cycle. Thus, if one operation is to be performed at 90° of the machine cycle, and another operation performed at 300° in the machine cycle, then there would be two comparators and two capacitors, together with the other elements of the circuit within the dotted line, one for the performance of each operation. In this preferred form of the invention, all the capacitors will be discharged at some suitable time after the output signal from the comparator has been emitted, so that all of the capacitors would be at zero voltage when the next succeeding cycle begins.

As shown in FIG. 1 for purposes of illustration, this may be accomplished in the preferred embodiment of the invention by providing a radially extending finger 17 on the rotating shaft 1 which passes by a sensor once during each machine cycle. This particular sensor is composed of a permanent magnet 18 which has a coil 19 around it with the leads 20 connected to the amplifier 21. As explained hereinbefore, each time the finger 17 passes the magnet 18 the magnetic field changes and a signal is emitted which is amplified by the amplifier 21 and is thereafter shaped by the pulse shaper 22.

This pulse is carried through line 23 to the transistor 24 which thereupon discharges the capacitor 12. At this point a new cycle begins and the operations which occur during each cycle will again be performed.

Those elements outside of the dotted line 16 in FIG. 1 are common to all circuits, i.e. the same sequence of signals generated and amplified by the amplifier 7 will be applied to as many circuits as there are operations to be performed. For three operations there will be three of the diodes 10, three resistors 11, three capacitors 12 and three comparators 15. Likewise there will be three transistors 24, one for each capacitor, so that at the beginning of a new cycle, the signal generated by the finger 17 and its associated sensor will discharge all of the capacitors. Alternatively, after the control signal is emitted the capacitor may be discharged and held in a discharged condition until the beginning of a new cycle.

It will also become evident, however, that in the arrangement where the resistor 11 is fixed and the resistor 13 is variable, then the resistors 13 and 14 have to become a part of each circuit for each operation.

Figure 4:
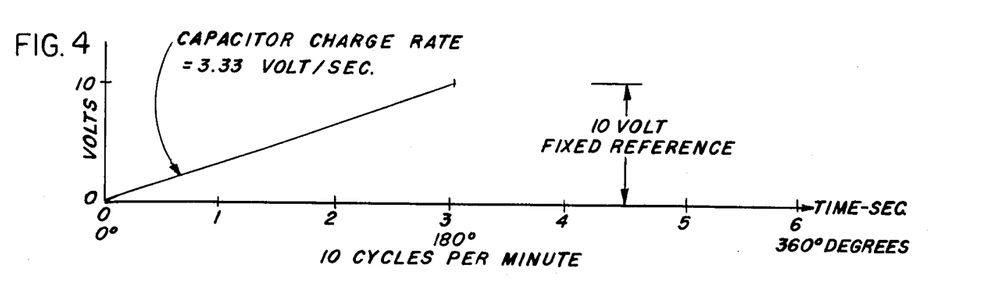
FIG. 4 is a graph, wherein voltage is plotted against machine cycles per minute, and showing voltage building up to a predetermined level at which point in a cycle a control signal is emitted for controlling an operation to be performed, and wherein the machine is operating at 10 cycles per minute and the output of the control signal occurs at 180° and the cycle.
Figure 5:
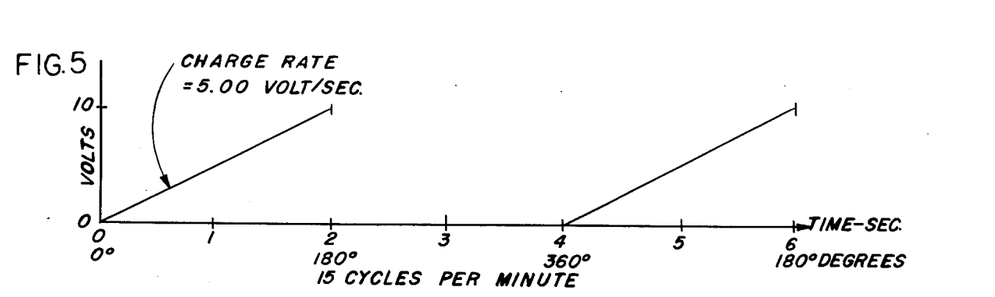
FIG. 5 is a graphic illustration similar to FIG. 4 but illustrating the timing when the machine is operating at 15 cycles per minute.
Figure 6:
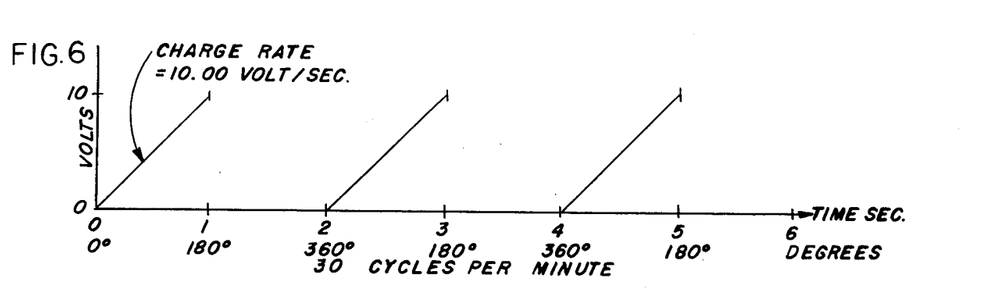
FIG. 6 is a graphic illustration similar to FIG. 4 but showing the machine operating at 30 cycles per minute.

Referring now to FIGS. 4, 5, and 6, there is illustrated graphic representations of the capacitor being charged up to the predetermined reference voltage from a zero voltage. In these figures voltage has been plotted against time in seconds and degrees to illustrate this feature for the machine operating at different speeds.

In each case it is presumed that the reference voltage will be 10 volts, so that as shown in FIG. 4, if an operation is to be performed at 180° of the machine cycle, and the machine is operating at 10 cycles per minute, the 10 volt reference voltage will be reached in three seconds, because the circuit will have been set to charge the capacitor at the rate of 3.33 volts per second.

FIG. 5 is a similar graphic illustration showing the machine operating at 15 cycles per minute. At this speed the reference voltage of 10 volts will be reached at 180° in the machine cycle in a matter of 2 seconds, because the capacitor is being charged at the rate of 5 volts per second, due to increased frequency of the pulses resulting from the increased speed of the machine.

In FIG. 6 the machine is operating at 30 cycles per minute, and it becomes evident that the 180° point in the machine cycle will be reached in 1 second and the reference voltage of 10 volts will also have been reached in 1 second.

No adjustment needs to be made as far as the resistors are concerned, because as the machine operates faster the frequency of the pulses will be proportionately greater, and therefore the voltage will be built up in the capacitor at a greater rate to perform the operation at the same cyclic degree.

It will be evident to those skilled in the art that this basic concept and the attendant results can be accomplished either by starting the capacitor at some voltage in excess of zero, and have it discharged back to zero, or the capacitor could be charged to zero voltage initially and have each of the signals charge down to a negative reference voltage at which point the comparator will emit the control signal.

As mentioned above, this invention is applicable for use in connection with any cyclically operable machine, but taking the illustration discussed briefly herein relating to a bag forming, filling and sealing machine, at the beginning of a machine cycle, if it is the point at which the jaws just close, all capacitors will be at their initial starting voltage, which may be zero or any other predetermined value. As the sequence of signals is emitted, and a typical capacitor charged, a control signal will be emitted at the time the reference voltage is reached. If the first operation which take place is the cutting of the material, and if this occurs at 90 cyclic degrees of the machine cycle, then the reference voltage in that particular capacitor will be reached at the 90° point. Other operations, such as the bag sealing and the like, which take place at various other cyclic degrees in the machine cycle, will occur as each capacitor for each operation reaches its predetermined reference voltage at the predetermined degree in the machine cycle for that particular operation.

Heretofore, cam switches have been provided for all of these operations, and all of such cams can be replaced by the electronic control means described herein. It is sometimes desirable for a control signal to be emitted a predetermined time period before a particular operation is to be performed. For example, again relating this concept to the bag machine, it requires a set predetermined time for the jaws, once signalled to close, to mechanically close, and this time must remain constant during each cycle of the machine regardless of how fast the machine is cycling. Thus, a cam may have been provided for this purpose. When the concept of the present invention is utilized for this purpose it is desirable to apply a "pre-charge" to a particular capacitor.

An example of this would be that if 0.6 seconds is required for the sealing jaws to close, then a control signal should be emitted to begin the closing of the jaws 0.6 seconds before the jaws just come together for the sealing operation, which occurs at a fixed degree in the machine cycle.

If a capacitor is charged at a rate so that it will reach the reference voltage at 360° in the machine cycle, then the application to the capacitor of an initial voltage proportional to the machine speed will cause the capacitor to be charged up and reach the reference value at a constant time rather than degrees, prior to the 360 cyclic degrees in each machine cycle regardless of machine speed.

Figure 7:
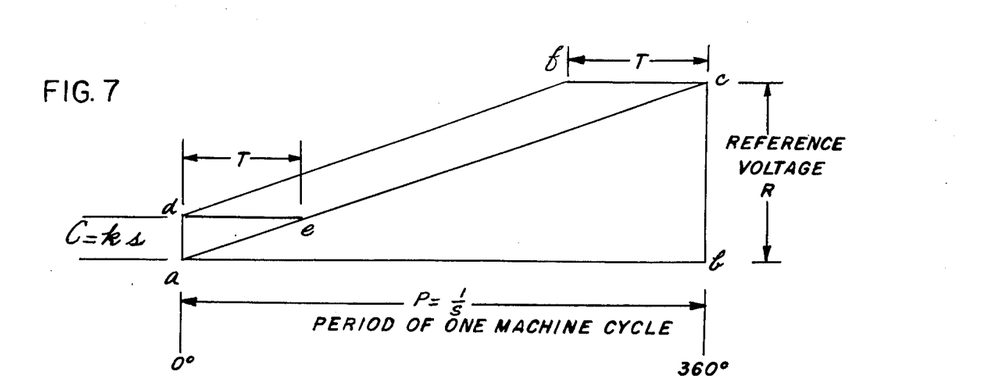
FIG. 7 is a graphic illustration showing a "pretime" principle wherein a control signal is emitted a predetermined time before a preselected cyclic degree point in the machine cycle has been reached.

Referring now briefly to FIG. 7 of the drawings, this is a graph wherein the line $a$–$b$ represents the period of one machine cycle; the line $b$–$c$ represents the reference voltage and the line $a$–$c$ represents the capacitor charge rate wherein the reference voltage is reached at the end of one machine cycle. In this illustration the pulses or voltage charging the capacitor have a magnitude many times that of the reference voltage, thus the capacitor charge rate may be successfully approximated by the straight line $a$–$c$.

The precharge on the capacitor is indicated by the line $a$–$d$, but the capacitor charge rate remains the same, although with the precharge the capacitor will be charged to the reference voltage level a period time T before the end of the cycle. This charge rate of the capacitor is illustrated by the line $d$–$f$.

This illustrates that, if the time T is 0.6 second then the reference voltage will be reached 0.6 second before the end of the predetermined cyclic degree.

If the line $d$–$e$ is drawn parallel to the line $f$–$c$, then, according to a geometry theorem line $d$–$e$ equals T. Further, by geometry, it is noted that triangle $a$–$d$–$e$ is similar to triangle $a$–$b$–$c$, and hence it may be said $$\frac{C}{T} = \frac{R}{P}$$

wherein C is the value of the precharge, T is the pretime desired, R is the reference voltage and P is the period of one machine cycle.

Then $$T = \frac{CP}{R} \text{ and } T = \frac{ks \cdot \frac{1}{s}}{R} = \frac{k}{R}$$

But $k$ and R are both constants, therefore the pretime T is independent of machine speed $s$.

Figure 3:
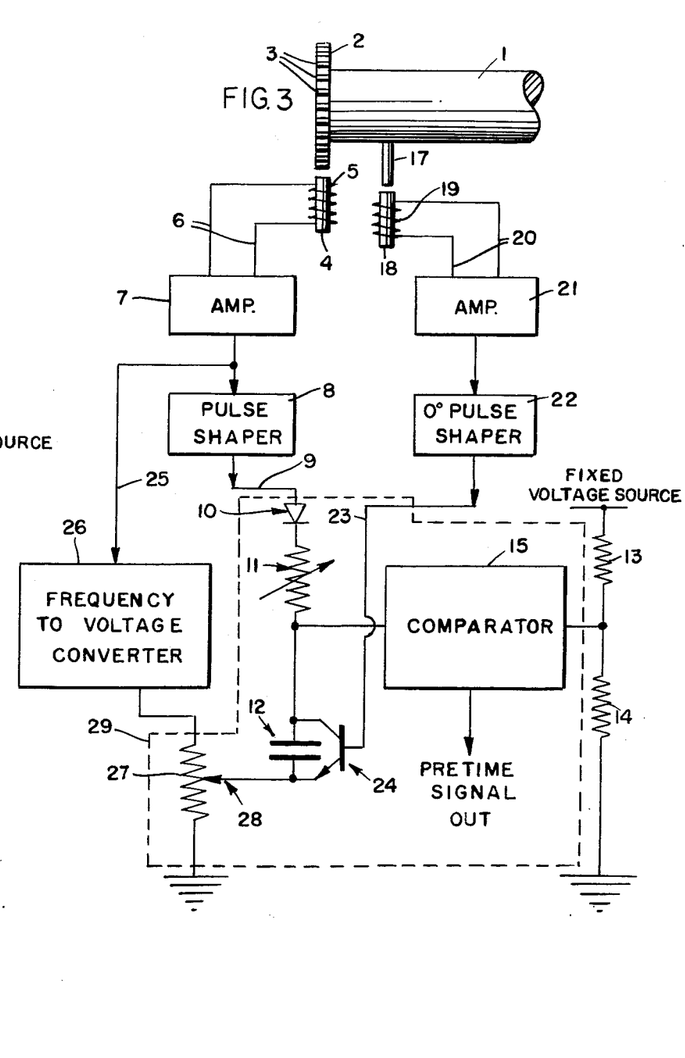
FIG. 3 is a diagram which illustrates a modified form of the invention wherein a "pre-time" control signal is emitted a predetermined time before a predetermined cyclic degree point.
Figure 8:
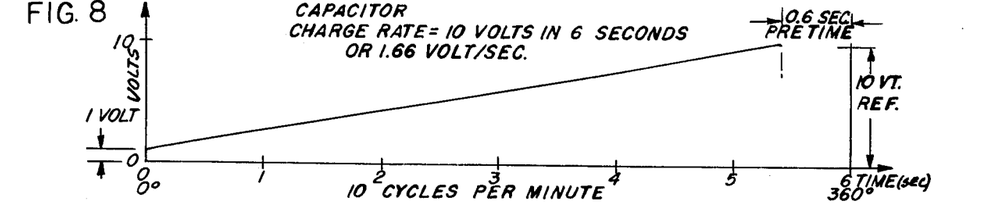
FIG. 8 is a graphic illustration of the use of the pre-timer circuit having a pre-time of 0.6 seconds, where an initial voltage is present, thereby causing the predetermined voltage level to be reached and a control signal to be emitted 0.6 seconds before the 360 cyclic degree point in the machine cycle and showing the machine as operating at 10 cycles per minute.
Figure 9:
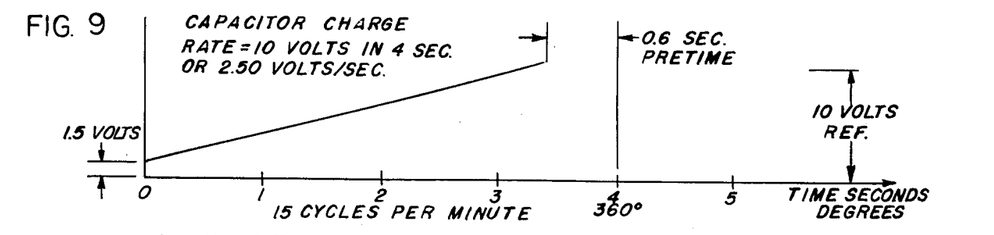
FIG. 9 is a graphic illustration similar to FIG. 8 but showing the machine operating at 15 cycles per minute.
Figure 10:
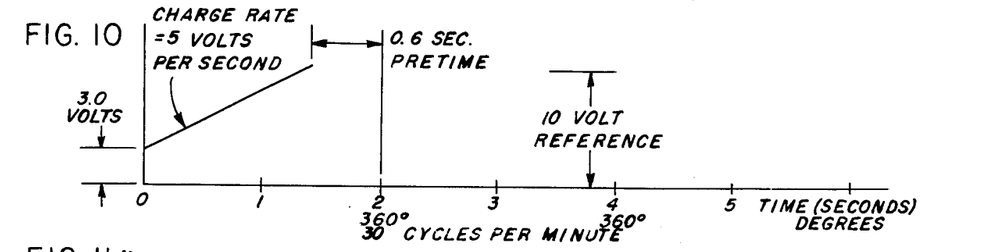
FIG. 10 is a graphic illustration similar to FIG. 8 but showing the machine operating at 30 cycles per minute.
Figure 11:
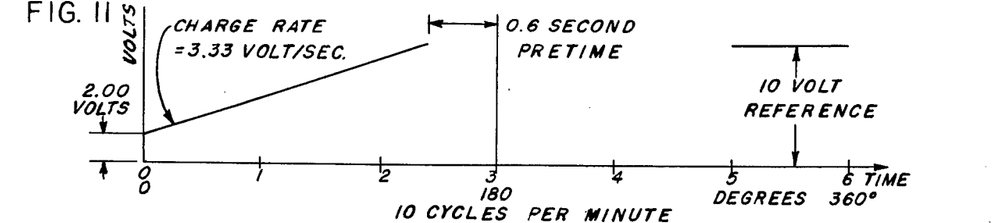
FIG. 11 is a graphic illustration similar to FIG. 8 but showing the control signal to be emitted 0.6 seconds before the 180 cyclic degree point in the machine cycle and operating at 10 cycles per minute.
Figure 12:
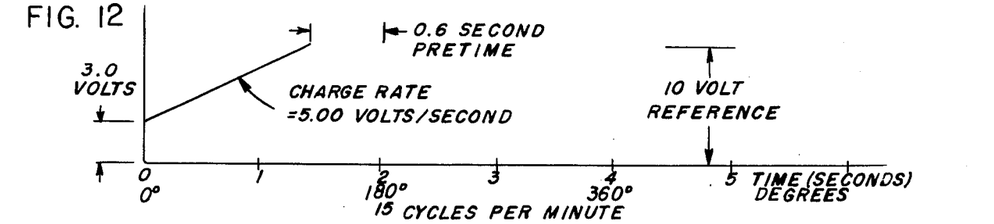
FIG. 12 is a graphic illustration similar to FIG. 11 but showing the machine as operating at 15 cycles per minute and FIG. 13 is a graphic illustration similar to FIG. 11 but showing the machine as operating at 30 cycles per minute.
Figure 13:
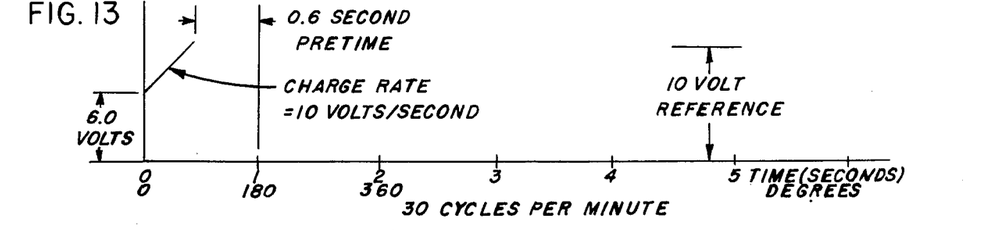

The circuit of FIG. 1, with modifications as shown in FIG. 3, is used to create a pretime prior to any chosen cyclic degree point. FIGS. 8, 9 and 10 illustrate the pretime occurring prior to 360° for three different machine speeds, while FIGS. 11, 12 and 13 illustrate a pretime circuit having a pretime of 0.6 seconds prior to 180 cyclic degrees of the machine cycle.

The amount of pretime can be controlled by changing the value of the constant $k$. It will be evident to those skilled in the art, however, that the precharge placed on the capacitor could alternatively be subtracted from the reference voltage.

Changing the chosen cycle degree prior to which the pretime signal occurs can be accomplished by charging the capacitor at a faster or slower rate as heretofore described with respect to FIG. 1.

One way of accomplishing this precharge concept is illustrated in the circuit of FIG. 3, wherein the sequence of signals are generated in the same way as described above with respect to FIG. 1, namely, by utilizing the toothed wheel 2, sensor comprising the magnet 4 and coil 5, amplifier 7 and pulse shaper 8. As before, the amplified and shaped pulse is delivered through diode 10 by the line 9 to the resistor 11 and capacitor 12. In this instance, however, the signals from the amplifier 7 are also applied through line 25 to the frequency-to-voltage converter 26. A portion of the output voltage of converter 26 is applied by means of potentiometer 27 in series with capacitor 12, so that the comparator 15 sees the sum of the portion of the converter 26 and the voltage of capacitor 12.

For example, again taking 10 volts as the voltage reference, if the potentiometer 27 is 4 volts and if the slide indicated by the arrow 28 is at the center thereof, then 2 volts will be applied to the lower plate of the capacitor 12. As the signals continue to be generated and received by the capacitor, the voltage on the top plate of the capacitor will be added to that in the lower plate so that when the upper plate reaches a charge of 8 volts, there will be a total of 10 volts which the comparator sees and thereupon emits its pretime signal.

Again, the resistors 13 and 14 comprise a voltage divider network between ground and a source of direct current voltage to produce a fixed reference voltage.

The elements shown within the dotted line 29 will be duplicated for each operation to be performed, as heretofore described in connection with FIG. 1.

FIG. 8 illustrates graphically a machine operating at 10 cycles per minute with a 1 volt precharge in the capacitor so that the reference of 10 volts will be reached 0.6 second before the completion of the 360° cycle.

In FIG. 9 the machine has been speeded up to 15 cycles per minute wherein it will be noted that the precharge placed on the capacitor is 1.5 volts so that the reference voltage will be reached 0.6 second prior to the 360 cyclic degrees of the machine cycle. Since the machine is operating faster the voltage is built up faster, but the value of the pretime will remain constant.

In FIG. 10 the machine is operating at 30 cycles per minute so that the 360° point will be reached in 2 seconds, but the reference voltage of 10 volts will still be reached at the same time of 0.6 second prior to the 360° point.

FIGS. 11, 12 and 13 illustrate graphically the same operation, but where the pretime is set to occur prior to the 180° point in the machine cycle instead of 360°.

These graphs illustrate that, regardless of the machine speed, the pretime will remain a constant for whatever value the control circuit is set for any given operation.

As indicated hereinabove, the voltage in the capacitor can be provided by a voltage generator instead of a signal or pulse generator for both the cyclic degree form of the invention as well as the pretime form of the invention. For example, the toothed wheel 2, could be provided with a sufficiently great number of teeth and be rotated at a sufficiently high speed to generate a voltage. In such case the pulse shaper can be eliminated, and the voltage will be applied directly to the diode 10, resistor 11, and capacitor 12. It should be mentioned, however, that in the case of a voltage generator used in the pretime form of the invention, the generated voltage should be greater than that with which the capacitor is to be charged. For a given range of cyclic rates, the magnitude of the voltage generated should be on the order of ten times the reference voltage to improve linearity.

From the foregoing description it will be evident that a novel control system has been developed and described herein for controlling one or more operations within successive cycles of a cyclically operated machine.

Changes may be made in the form, construction and arrangement of parts from those disclosed herein without in any way departing from the spirit of the invention or sacrificing any of the attendant advantage thereof, provided, however, that such changes fall within the scope of the claims appended hereto.

I claim:

1. In a cyclic machine adapted to perform one or more operations during a cycle thereof, control means for establishing the beginning of a cycle and for controlling the timing of the occurrences of said operations, comprising,
    a. drive means for driving the machine through successive cycles,
    b. signal generator means to establish a sequence of signals within a cycle the frequency of which is proportional to the speed of the machine, each of said signals producing a charge,
    c. detecting means for detecting a preselected repeatable point of reference in a cycle,
    d. first means associated with each operation to be performed which has a first predetermined charge level and responsive to each of said signals to provide a correspondingly different charge level until a second predetermined charge level is reached,
    e. second means responsive to said second predetermined charge level to emit a control signal for the operation associated therewith, and
    f. third means to change the charge level from said second predetermined charge level to said first charge level after the emission of said control signal, whereby at the time said point of reference is detected said first charge level will have been reached.

2. The combination of elements defined in claim 1, which includes adjusting means for regulating the amount of change which occurs in the charge level as each signal is received, and in which the different charge levels represent correspondingly different points in a machine cycle.

3. The combination of elements defined in claim 1, which includes adjusting means for regulating the value of at least one of said charge levels, and in which the different charge levels represent correspondingly different points in a machine cycle.

4. The combination of elements defined in claim 1, wherein said signal generator means includes a movable member which travels cyclically in a predetermined motion.

5. The combination of elements defined in claim 1, wherein said signal generator means includes a rotating member and a sensor, said rotating member having thereon a plurality of signal inducing members each of which is adapted to be sensed by said sensor to produce a signal.

6. The combination of elements defined in claim 1, wherein said second means includes comparator means connected to said first means.

7. The combination of elements defined in claim 1, wherein said signal generator means generates pulses, the pattern of which is repeated each successive cycle.

8. The combination of elements defined in claim 2, wherein said adjusting means comprises a variable resistor.

9. In a cyclic machine adapted to perform one or more operations during a cycle thereof, control means for establishing the beginning of a cycle and for controlling the timing of the occurrences of said operations comprising,
    a. drive means for driving the machine through successive cycles,
    b. pulse generator means to establish a sequence of pulses within a cycle the frequency of which is proportional to the speed of the machine, each of said pulses producing a charge,
    c. detecting means for detecting a preselected repeatable point of reference in a cycle,
    d. accumulating means associated with each operation to be performed which has a first predetermined charge level and adapted to receive and respond to said pulses to accumulate charges produced by each pulse until a second predetermined charge level is reached,
    e. means responsive to said second predetermined charge level to emit a control signal for the operation associated therewith, and f. means to discharge the accumulated charge after the emission of said control signal, whereby at the time said point of reference is detected, said first charge level will have been reached.

10. The combination of elements defined in claim 9, which includes adjusting means for regulating the amount of increase which occurs in the charge level as each pulse is received, and in which the different charge levels represent correspondingly different points in a machine cycle.

11. The combination of elements defined in claim 9, which includes adjusting means for regulating the value of at least one of said charge levels, and in which the different charge levels represent correspondingly different points in a machine cycle.

12. The combination of elements defined in claim 9, wherein said means responsive to said second predetermined charge level includes comparator means connected to said accumulating means.

13. The combination of elements defined in claim 9, wherein said accumulating means comprises a capacitor.

14. The combination of elements defined in claim 10, wherein said adjusting means comprises a variable resistor.

15. In a cyclic machine adapted to perform one or more operations during a cycle thereof, electronic controlled means for establishing the beginning of a cycle and for controlling the timing of the occurrences of said operations, comprising,
   a. drive means for driving the machine through successive cycles,
   b. signal generating means to establish a sequence of signals within a cycle, each of said signals producing a charge, said signal generating means including
      1. a first rotating member having thereon a plurality of signal inducing members, and
      2. electromagnetic sensor means for sensing each of said signal inducing members and for producing a signal,
   c. a second rotating member,
   d. means for rotating both of said rotating members at a speed which is proportional to the speed of the machine,
   e. detecting means for detecting a preselected reference point of rotation of said second rotating member once each revolution thereof at the beginning of each machine cycle,
   f. first means associated with each operation to be performed which has a first predetermined charge level and responsive to each of said signals to provide a correspondingly different charge level until a second predetermined charge level is reached, including
      1. a diode through which each signal passes,
      2. a resistor to limit the charge to be received from each signal, and
      3. a capacitor which receives said charge,
   g. comparator means connected to said capacitor responsive to said second predetermined charge level to emit a control signal for the operation associated therewith and
   h. second means to change the charge level from said second predetermined charge level to said first predetermined charge level after the emission of said control signal, whereby at the time said reference point of rotation of said second rotating member is detected and the next successive machine cycle begins, said first charge level will have been reached.

16. The combination of elements defined in claim 15, which includes adjusting means for regulating the amount of change which occurs in the charge level as each signal is received, and in which the different charge levels represent correspondingly different degrees of rotation of said second rotating member and points in a machine cycle.

17. In a cyclic machine adapted to perform one or more operations during a cycle thereof, electronic control means for establishing the beginning of a cycle and for controlling the timing of the occurrences of said operations, comprising,
   a. drive means for driving the machine through successive cycles,
   b. pulse generating means to establish a sequence of pulses within a cycle, each of said pulses producing a charge, including
      1. a first rotating member having thereon a plurality of pulse inducing members, and
      2. electromagnetic sensor means for sensing each of said pulse inducing members and for producing a pulse,
   c. a second rotating member,
   d. means for rotating both of said rotating members at a speed which is proportional to the speed of the machine,
   e. detecting means for detecting a preselected reference point of rotation of said second rotating member once each revolution thereof at the beginning of each machine cycle,
   f. a capacitor associated with each operation to be performed for receiving and responding to said pulses to accumulate charges produced by each pulse until a predetermined reference voltage is reached,
   g. means responsive to said reference voltage to emit a control signal for the operation associated therewith, and
   h. means to discharge the accumulated charge after the emission of said control signal, whereby at the same time said point of reference on said second rotating member is detected and the next successive machine cycle begins, said capacitor will be at zero voltage.

18. In a cyclic machine adapted to perform one or more operations during a cycle thereof, control means for establishing the beginning of a cycle and for controlling the timing of the occurrences of said operations, comprising,
   a. drive means for driving the machine through successive cycles,
   b. voltage generator means for generating a voltage proportional to the speed of the machine,
   c. detecting means for detecting a preselected repeatable point of reference in a cycle,
   d. first means associated with each operation to be performed which has a first predetermined voltage level and responsive to said voltage generator means to change the voltage level until a second predetermined voltage level is reached,
   e. second means responsive to said second predetermined voltage level to emit a control signal for the operation associated therewith, and
   f. third means to change the voltage from said second predetermined voltage level to said first predetermined voltage level after the emission of said control signal, whereby at the time said point of reference is detected said first voltage level will have been reached.

19. The method of controlling the timing of the occurrences of operations within a cycle of operations and of establishing the beginning of a cycle, comprising the steps of,
   a. detecting a preselected repeatable point of reference in a cycle,
   b. establishing first and second predetermined charge levels associated with each operation to be performed,
   c. changing the charge level from said first predetermined charge level to said second predetermined charge level at a rate of change proportional to the speed of each cycle each time the associated operation is to be performed,
   d. emitting a control signal for an operation to be controlled thereby when said second predetermined charge level is reached, and
   e. thereafter changing the charge level back to said first predetermined charge level after the emission of said control signal, whereby, at the time said point of reference is detected, said first charge level will have been reached.

20. The method of controlling the timing of the occurrences of operations within a cycle of operations and of establishing the beginning of a cycle, comprising the steps of,
   a. establishing a sequence of signals within a cycle, each of said signals producing a charge, and the frequency of said signals being proportional to the speed of each cycle,
   b. detecting a preselected repeatable point of reference in a cycle,
   c. establishing first and second predetermined charge levels associated with each operation to be performed,
   d. changing the charge level from said first predetermined charge level to said second predetermined charge level by responding to each of said signals, for each operation,
   e. emitting a control signal for an operation to be controlled thereby when said second predetermined charge level is reached, and
   f. thereafter changing the charge level back to said first predetermined charge level after the emission of said control signal, whereby, at the time said point of reference is detected, said first charge level will have been reached.

21. In a cyclic machine adapted to perform one or more operations during a cycle thereof, control means for establishing the beginning of a cycle and for controlling the timing of the occurrences of said operations, comprising,
   a. drive means for driving the machine through successive cycles,
   b. signal generator means to establish a sequence of signals within a cycle the frequency of which is proportional to the speed of the machine, each of said signals producing a charge,
   c. detecting means for detecting a preselected repeatable point of reference in a cycle,
   d. first means associated with each operation to be performed which has a first predetermined charge level and responsive to each of said signals to provide a correspondingly different charge level until a second predetermined charge level is reached,
   e. second means responsive to said second predetermined charge level to emit a control signal for the operation associated therewith,
   f. third means to change the charge level from said second predetermined charge level to said first charge level after the emission of said control signal, whereby at the time said point of reference is detected said first charge level will have been reached, and
   g. means for establishing a different value of said first predetermined charge level, which value is proportionate to machine speed, whereby the time at which said second predetermined charge level is reached is advanced in the machine cycle a fixed time period regardless of machine speed.

22. In a cyclic machine adapted to perform one or more operations during a cycle thereof, control means for establishing the beginning of a cycle and for controlling the timing of the occurrences of said operations, comprising,
   a. drive means for driving the machine through successive cycles,
   b. signal generator means to establish a sequence of signals within a cycle the frequency of which is proportional to the speed of the machine, each of said signals producing a charge,
   c. detecting means for detecting a preselected repeatable point of reference in a cycle,
   d. first means associated with each operation to be performed which has a first predetermined charge level and responsive to each of said signals to provide a correspondingly different charge level until a second predetermined charge level is reached,
   e. second means responsive to said second predetermined charge level to emit a control signal for the operation associated therewith,
   f. third means to change the charge level from said second predetermined charge level to said first charge level after the emission of said control signal, whereby at the time said point of reference is detected said first charge level will have been reached, and
   g. means for establishing a different value of said second charge level which value is proportionate to machine speed, whereby the time at which said second predetermined charge level is reached is advanced in the machine cycle a fixed time period regardless of machine speed.

23. In a cyclic machine adapted to perform one or more operations during a cycle thereof, control means for establishing the beginning of a cycle and for controlling the timing of the occurrences of said operations comprising,
   a. drive means for driving the machine through successive cycles,
   b. pulse generator means to establish a sequence of pulses within a cycle the frequency of which is proportional to the speed of the machine, each of said pulses producing a charge,
   d. detecting means for detecting a preselected repeatable point of reference in a cycle,
   d. accumulating means associated with each operation to be performed which has a first predetermined charge level and adapted to receive and respond to said pulses to accumulate charges produced by each pulse until a second predetermined charge level is reached, e. means responsive to said second predetermined charge level to emit a control signal for the operation associated therewith, f. means to discharge the accumulated charge after the emission of said control signal, whereby at the time said point of reference is detected, said first charge level will have been reached, and means for establishing a different value for said first predetermined charge level which value is proportionate to a machine speed, whereby the time at which said second predetermined charge level is reached is advanced a constant amount in the machine cycle regardless of the useable cyclic speed of the machine.

24. The combination of elements defined in claim 23, wherein said accumulating means includes a capacitor, and wherein said means for establishing a different value for said first predetermined charge level includes a frequency to voltage converter connected to said pulse generator means for applying a predetermined voltage to said capacitor.

25. In a cyclic machine adapted to perform one or more operations during a cycle thereof, electronic controlled means for establishing the beginning of a cycle and for controlling the timing of the occurrences of said operations, comprising, a. drive means for driving the machine through successive cycles, b. signal generating means to establish a sequence of signals within a cycle, each of said signals producing a charge, said signal generating means including
   1. a first rotating member having thereon a plurality of signal inducing members, and
   2. electromagnetic sensor means for sensing each of said signal inducing members and for producing a signal, c. a second rotating member, d. means for rotating both of said rotating members at a speed which is proportional to the speed of the machine, e. detecting means for detecting a preselected reference point of rotation of said second rotating member once each revolution thereof at the beginning of each machine cycle, first means associated with each operation to be performed which has a first predetermined charge level and responsive to each of said signals to provide a correspondingly different charge level until a second predetermined charge level is reached, including
   1. a diode through which each signal passes,
   2. a resistor to limit the charge to be received from each signal, and
   3. a capacitor which receives and charge, g. comparator means connected to said capacitor responsive to said second predetermined charge level to emit a control signal for the operation associated therewith, h. second means to change the charge level from said second predetermined charge level to said first predetermined charge level after the emission of said control signal, whereby at the time said reference point of rotation of said second rotating member is detected and the next successive machine cycle begins, said first charge level will have been reached, and i. means for establishing a different value for said first predetermined charge level, which is proportionate to machine speed, whereby the time at which said second predetermined charge level is reached is advanced a constant amount in the machine cycle regardless of the useable cyclic speed of the machine.

* * * * *